United States Patent [19]

Yamanobe et al.

[11] Patent Number: 4,822,146

[45] Date of Patent: Apr. 18, 1989

[54] OPTICAL MODULATION ELEMENT

[75] Inventors: Masato Yamanobe, Machida; Yasuyuki Watanabe, Chigasaki; Yukitoshi Ohkubo, Yokohama, all of Japan

[73] Assignee: Canon Kabushiki Kaisha, Tokyo, Japan

[21] Appl. No.: 33,192

[22] Filed: Apr. 2, 1987

[30] Foreign Application Priority Data

Apr. 7, 1986 [JP] Japan .................................. 61-080608
Apr. 7, 1986 [JP] Japan .................................. 61-080609

[51] Int. Cl.$^4$ .............................................. G02F 1/13
[52] U.S. Cl. .................................. 350/348; 350/347 R; 350/347 V
[58] Field of Search ................... 350/347 V, 348, 387, 350/347 R

[56] References Cited

U.S. PATENT DOCUMENTS 4,251,137  2/1981  Knop et al. ..................... 350/347 V
4,466,702  8/1984  Wiener-Avnear et al. .... 350/347 R
4,729,640  3/1988  Sakata .............................. 350/347 V

OTHER PUBLICATIONS

Kowel, Cleverly, and Kornreich, "Focusing by Electrical Modulation of Refraction in a Liquid Crystal Cell", *Applied Optics*, vol. 23, No. 2, Jan. 15, 1984, pp. 278–280.

*Primary Examiner*—Stanley D. Miller
*Assistant Examiner*—Anita E. Pellman
*Attorney, Agent, or Firm*—Fitzpatrick, Cella, Harper & Scinto

[57] ABSTRACT

An optical modulation element which enables substantially total transmission of incident light and provides a high contrast when it as used as a display element, thereby enabling multiplex driving.

7 Claims, 3 Drawing Sheets

REFRACTION INDEX
CONTROL VOLTAGE (V)

OPTICAL MODULATION ELEMENT

BACKGROUND OF THE INVENTION

1. Field of the Invention

The present invention relates to an optical modulation element and, more particularly, to an optical modulation element wherein a grating and a material having a variable refractive refraction index are combined to control the refraction index of the variable refraction index material, thereby causing desired diffraction of incident light.

2. Related Background Art

A conventional well-known optical modulation element is a so-called TN (twisted nematic)-type liquid crystal display element which consists of a pair of polarizing plates arranged such that their polarizing directions are perpendicular to each other, and an element which is arranged between the pair of polarizing plates and obtained by sealing a liquid crystal on opposing substrate surfaces of a pair of transparent substrates and making orthogonal orientation treatment each other. The orientation state of the liquid crystal is switched between a twisted state and a state perpendicular to the substrate surface, thereby modulating incident light. A display element of this type is widely used since it has simple constructions and be able to be easily driven. However, since this display element transmits and shields light by utilizing two polarizing plates, its transmittance rate during extinguishing, i.e., during light transmission is poor. Therefore, this element is not a preferable optical modulation element in terms of light utilization efficiency.

A so-called guest-host mode liquid crystal display element in which dyes are mixed in liquid crystal molecules is known as another display element of the same type which utilizes a liquid crystal. However, because of the presence of the dyes, this display element has a transmittance during extinguishing of as low as about 75% at maximum.

Japanese Patent examined Publication No. 3928/1978, U.S. Pat. No. 4,251,137, and so on, disclose a display element or a variable subtractive process filter element wherein a reflective or transmitting phase diffraction grating is combined with a liquid crystal. The elements disclosed in these articles have good light utilization efficiency. However, the element disclosed in Japanese Patent examined Publication No. 3928/1978 has a mere ornamental effect and is not satisfactory as an optical modulation element for transmitting or shielding light. According to the variable subtractive process filter disclosed in U.S. Pat. No. 4,251,137, diffraction gratings are formed on a pair of opposing substrate surfaces such that their orientation directions are perpendicular to each other. A liquid crystal is filled between these substrates to control the orientation of the liquid crystal molecules, thereby changing the refraction index of the filter element. When the difference in refraction index between the material constituting the diffraction gratings and the liquid crystal is changed, the spectral transmittance characteristics can be changed. Therefore, this filter has a high light utilization efficiency and has high performance as a variable subtractive process filter. This variable subtractive process filter mainly transmits and displays three primary colors of R, G, and B, or their complementary colors C, M and Y. However, for example, during extinguishing, i.e., when incident light is to be totally transmitted, extinguishing, i.e., total transmission is impossible since the wavelength dependency of the refractive index of the liquid crystal and that of the material constituting the diffraction grating are not considered at all. As a result, the contrast is degraded.

With an element constitution of this type consisting of diffraction gratings and the variable refraction index material, when the refraction index of the variable refraction index material is to be controlled, total transmission and extinguishing of incident light are difficult to obtain since no definite threshold value at which the refraction index changes exists and the change is very slow. Also, multiplex driving cannot be performed when a plurality of elements of this type are used to provide a display apparatus.

SUMMARY OF THE INVENTION

The present invention has been made in view of the above drawbacks and has as its object to provide an optical modulation element which enables total transmission of incident light and provides a high contrast when it is used as a display element.

It is another object of the present invention to provide an optical modulation element which enables substantially total transmission of incident light and has a high contrast when it is used as a display element, thereby enabling multiplex driving.

In order to achieve the above objects, according to an aspect of the present invention, there is provided an optical modulation element having a plurality of transparent substrates, a diffraction grating present at least on one of opposing surfaces of adjacent transparent substrates, a variable refraction index material which is arranged between the plurality of transparent substrates, and means for controlling the refraction index of the variable refraction index material. This element is characterized in that, assuming that a predetermined refraction index present between maximum and minimum refraction indexes of the variable refraction index material, $n_{max}$, $n_{min}$, is $n\theta$ and that the refraction index of the material constituting the diffraction grating is $n_g$, the refraction index $n\theta$ is substantially equal to the refraction index $n_g$ in the wavelength range of incident light.

In order to achieve the above objects, according to another aspect of the present invention, there is provided an optical modulation element having a plurality of substrates, a diffraction grating present at least on one of opposing surfaces of adjacent substrates, a variable refraction index material which is arranged between the plurality of substrates, and means for controlling the refraction index of the variable refraction index material. This element is characterized in that, assuming that the maximum and minimum refraction indexes of the variable refraction index material are $n_{max}$ and $n_{min}$, respectively, and that the refraction index $n_g$ of the material constituting the diffraction grating is $n_g$, a curve indicating the wavelength dependency of the refraction index $n_g$ is substantially identical to a curve indicating the wavelength dependency of the refraction index $n_{max}$ or $n_{min}$ in the used wavelength range.

Other objects, features and advantages of the present invention will become apparent from the respective embodiments to be described below.

DETAILED DESCRIPTION OF THE PREFERRED EMBODIMENTS

Figure 1:
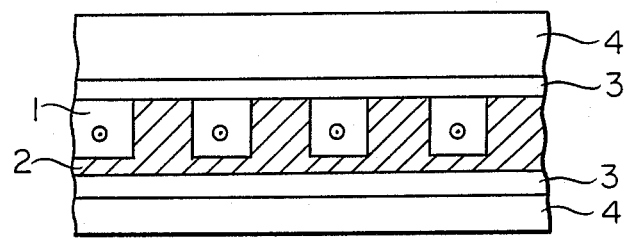
FIG. 1 shows the basic structure of an optical modulation element according to the present invention.
Figure 1:
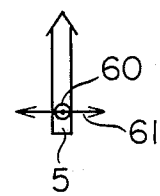

FIG. 1 shows the basic structure of an optical modulation element according to the present invention and is a view for explaining its function. Referring to FIG. 1, the optical modulation element has a material 1, represented by a liquid crystal material, having a variable refraction index, a diffraction grating 2 made of a material transparent to a used wavelength, transparent electrodes 3, and transparent substrates 4 made of a transparent optical material. The diffraction grating 2 is a so-called phase diffraction grating made of a relief pattern. Incident light 5 has arbitrary polarizing characteristics. Polarized components 60 and 61 are orthogonal polarized components of the incident light 5 and are respectively perpendicular and parallel to the surface of the sheet of drawing.

In the optical modulation element shown in FIG. 1, the transparent electrodes 3 are formed on the opposing surfaces of the pair of transparent substrates 4. The rectangular diffraction grating 2 made of the transparent material is formed on the transparent electrode 3 on one of the pair of transparent substrates 4. The variable refraction index material 1 is provided in the grooves (recesses) of the diffraction grating 2. When an electric field is applied to the material 1 through the transparent electrodes 3, the refraction index of the material 1 is changed.

The modulation principle of this optical modulation element will be described with reference to FIG. 1. For the sake of easy explanation, note that the variable refraction index material 1 will be referred to as a liquid crystal 1 hereinafter, and that predetermined diffraction effect is caused by controlling the orientation state of the liquid crystal 1 by application of an electric field.

In the static state shown in FIG. 1 wherein the electric field is not applied, assume that the liquid crystal 1 is oriented along the direction of the grooves of the diffraction grating 2, i.e., along a direction perpendicular to the surface of the sheet of drawing and maintains a homogeneous orientation. Therefore, of the polarized components 60 and 61 of the light 5 incident on the optical modulation element in the static state, the polarized component 61 perpendicular to the orientation direction of the liquid crystal 1 is influenced by a normal refraction index $n_o$ of the liquid crystal 1, and the polarized component 60 parallel to the orientation direction of the liquid crystal 1 is influenced by an abnormal refraction index $n_e$. When a rectangular diffraction grating is used, the diffraction efficiency $\eta_o$ of 0th-order transmitted diffracted light with respect to the polarized component 60 or 61 of the incident light 5 can be approximately represented by the following relation (1):

$$\eta_o = \tfrac{1}{2}\{1 + \cos(2\pi \Delta n T/\lambda)\} \tag{1}$$

where $n_g$ is the refraction index of the diffraction grating 2, $\lambda$ is the wavelength of the incident light 5, T is the thickness of the diffraction grating 2, and $\Delta n$ represents a difference in the diffraction index between the refraction index $n_g$ of the diffraction grating 2 and the refraction index $n_e$ or $n_o$ of the liquid crystal 1. With respect to the polarized component 60 of the incident light 5, $\Delta n = |n_e - n_g|$. With respect to the polarized component 61, $\Delta n = |n_g - n_o|$.

Therefore, from relation (1), the diffraction efficiency $\eta_o$ of the 0th-order transmitted diffracted light is $\eta_o = 1$ when $\Delta n = 0$, i.e., $n_e = n_g$ or $n_o = n_g$, and is $\eta_o = 0$ when $$\Delta n T = (m + \tfrac{1}{2})\lambda$$

$$(m = 0, 1, 2, 3, \ldots)$$

When an electric field is applied to the crystal liquid 1 through the transparent electrodes 3, the orientation direction (direction of the optical axis) of the liquid crystal 1 gradually changes, the polarized component 61 of the incident light 5 is constantly influenced by the normal refraction index $\eta_o$ of the liquid crystal 1 irrespective of the electric field application, and the polarized component 60 of the incident light 5 is influenced by a synthetic refraction index $n\theta$ which is synthesized from the abnormal and normal refraction indexes $\eta_e$ and $\theta_o$ of the liquid crystal 1 at a predetermined ratio. Needless to say, the synthetic refraction index $n\theta$ changes as the orientation direction of the liquid crystal 1 changes. When the intensity of the electric field is increased, the liquid crystal 1 is oriented perpendicular to the substrates 4 (transparent electrodes 3) and set in a homeotropic orientation state. Thus, the polarized components 60 and 61 of the incident light 5 are influenced by the normal refraction index $\eta_o$ of the liquid crystal and are saturated.

In this state, the incident light 5 is modulated in accordance with relation (1).

Figure 2:
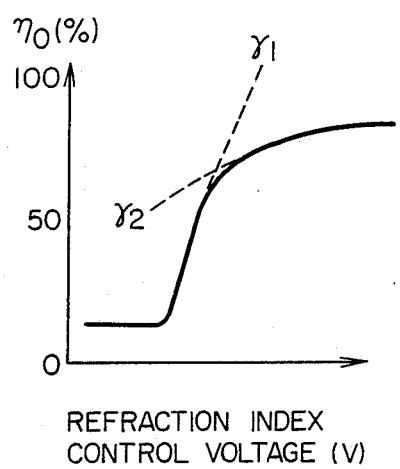
FIG. 2 shows a relationship between the voltage (V) and diffraction efficiency ($\eta_o$) of a conventional optical modulation element.

FIG. 2 shows the voltage dependency of the diffraction efficiency $\eta_o$, indicated by relation (1), of a conventional optical modulation element which has a basic structure as shown in FIG. 1 and in which a liquid crystal 1 is oriented by diffraction gratings 2. However, when $\eta_g = \eta_o$, the polarized component 61 of incident light 5 does not depend on the electric field but is influenced by the normal refraction index $\eta_o$ of the liquid crystal 1. Therefore, total transmission is always obtained. The diffraction efficiency $\eta_o$ shown in FIG. 2 is with respect to the polarized component 6 of the incident light 5. In the graph shown in FIG. 2, a refraction index control voltage (V) is plotted along the axis of abscissa, a diffraction efficiency ($\eta_o$) is plotted along the axis of ordinate, and $\gamma1$ and $\gamma2$ represent the major gradients of the V-$\eta_o$ curve.

As is seen from FIG. 2, the gradients of the V-$\eta_o$ curve has two gradient components $\gamma1$ and $\gamma2$ or more. If the change in the curve is slow, the V-$\eta_o$ curve has no steep gradients required for normal multiplex driving. Therefore, it is difficult to perform multiplex driving. It is also difficult to totally transmit the polarized component 60 at a low voltage.

Furthermore, as is apparent from relation (1), when incident light includes components of a plurality of wavelengths, the diffraction efficiency $\eta_o$ is greatly influenced by a refraction index difference $\Delta n$ between the refraction index $n_g$ of a material constituting the diffraction grating 2 and the index $n_e$ or $n_o$ ($n\theta$) of the liquid crystal 1, and by the wavelength dispersion characteristics of the refraction indexes $n_g$, $n_o$, and $n_e$ ($n\theta$). Therefore, if the element has particularly poor wavelength dispersion characteristics, total transmission cannot be obtained.

In the optical modulation element according to the present invention having the structure shown in FIG. 1, however, firstly the wavelength dispersion characteristics of the normal refraction index $n_o$ of the liquid crystal 1 and those of the refraction index $n_g$ of the material constituting the diffraction grating 2 are set to substantially coincide in the entire wavelength range of the incident light. Secondly the refraction index $n\theta$ ($n_o < n\theta < n_e$) of the liquid crystal 1 and the refraction index $n_g$ of the material constituting the diffraction grating 2 $n_g$ are set to coincide. As a result, a decrease in transmittance caused by the wavelength dispersion characteristics of the refraction indexes of the respective portions (the diffraction grating and variable refraction index material) that constitute the element is prevented, thus enabling total transmission. At the same time, a steep gradient of the V-$\eta_o$ curve is set, thereby substantially enabling multiplex driving. More specifically, with reference to FIG. 1, a predetermined synthetic refraction index $n\theta$ present between the abnormal and normal refraction indexes $n_e$ and $n_o$ of the liquid crystal 1 is a refraction index in a state which is obtained before the liquid crystal 1 is oriented completely perpendicular to the substrates 4 by an electric field, and in which liquid crystal molecules are inclined through a predetermined angle. When the refraction index $n_g$ of the material constituting the diffraction grating 2 and the refraction index $n\theta$ in this state are set to be the same, the refraction indexes of the liquid crystal 1 and diffraction grating 2 can be matched with an electric field of a low intensity, total transmission can be obtained with a low voltage, and the V-$\eta_o$ curve becomes steep.

As described above, when the predetermined value $n\theta$ between the maximum and minimum refraction indexes $n_{max}$ and $n_{min}$ ($n_{min} < n_o < n_{max}$) of the variable refraction index material, as the liquid crystal 1, is set to be the same as the refraction index $n_g$ of the material constituting the diffraction grating 2, the voltage characteristics of the light transmittance of the element can be improved.

When the wavelength dependency of $n\theta$, i.e., $n\theta(\lambda)$, and the wavelength dependency of $n_g$, i.e., $n_g(\lambda)$, substantially coincide in the wavelength range of the incident light, the transmittance of the incident light can be greatly improved. This is achieved by setting substantially the same phases (degrees of change) of the curves of the wavelength dependencies $n_g(\lambda)$ and $n_o(\lambda)$ or $n_e(\lambda)$.

The practical arrangement of the optical modulation element according to the present invention will be described. A pair of usual glass substrates were used and a transparent electrode, such as an ITO, was formed on one surface of each glass substrate. A diffraction grating was formed by SEL-N (refraction index $n_g = 1.57$; available from Somaru Kogyo K.K.) on the transparent electrode on one glass substrate. The two substrates were adhered such that the transparent electrodes opposed each other. RO-TN403 (nematic liquid crystal available from Rosch, $n_e = 1.79$, $n_o = 1.53$) was filled between the two substrates, thus forming an optical modulation element as shown in FIG. 1.

Figure 3:
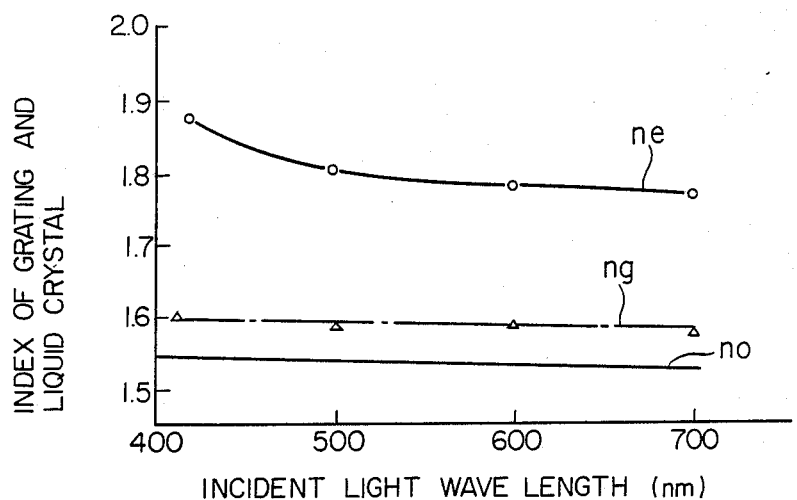
FIG. 3 shows the wavelength dispersion characteristics of the refraction indexes of the diffraction grating and liquid crystal material of the optical modulation element according to the present invention.

FIG. 3 shows the wavelength dispersion characteristics of the refraction indexes of SEL-N ($n_g$) and RO-TN403 ($n_e$, $n_o$) for white light at a normal temperature. In FIG. 3, the wavelength $\lambda$ (nm) of incident light is plotted along the axis of abscissa and the refraction indexes of SEL-N and RO-TN403 are plotted along the axis of ordinate. As is seen from FIG. 3, ($n_e - n_o$) is substantially constant in the entire wavelength range of the incident light and the wavelength dispersion characteristics of $n_g$ and $n_o$ form similar curves although their absolute values are different. Therefore, total transmission can be obtained when $n_g(\lambda)$ and $n_o(\lambda)$ ($n\theta > n_o$) substantially coincide.

Figure 4:
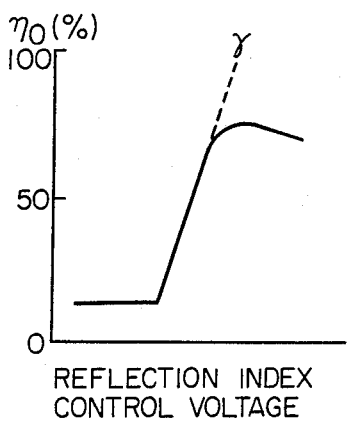
FIG. 4 shows a relationship between the voltage (V) and diffraction efficiency ($\eta_o$) of the optical modulation element according to the present invention.

FIG. 4 shows a V-$\eta_o$ curve of the voltage dependency of the diffraction efficiency $\eta_o$ of the 0th-order transmitted diffracted light of the optical modulation element of this embodiment. As is seen from FIG. 4, the V-$\eta_o$ curve of this embodiment exhibits a steep rise and its gradient component mainly consists of only $\gamma1$. Therefore, total transmission can be obtained with a low voltage compared to the V-$\eta_o$ curve of FIG. 2. Also, multiplex driving is also possible.

In this embodiment, a transmission-type optical modulation element is exemplified. However, an optical reflection film can be formed on one substrate, thus providing a reflection-type optical modulation element. However, in the reflection-type element, since the action of the diffracted light in the element becomes complex, the transmission-type optical modulation element is more preferable when design and application of, e.g., an actual display element are considered. In this case, a diffraction grating, a variable refraction index material, a substrate, and so on must be transparent to a used wavelength.

Figures 5A, 5B, 5C:
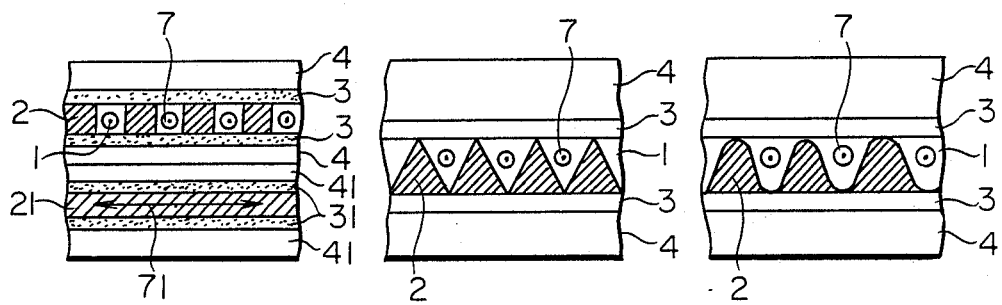
FIGS. 5A to 5C are views respectively showing optical modulation elements according to other embodiments of the present invention.

FIGS. 5A to 5C are schematic diagrams respectively showing optical modulation elements according to other embodiments of the present invention. In FIGS. 5A to 5C, the same reference numerals as in FIG. 1 denote the same portions. Directions 7 and 71 are the directions of the optical axes of a variable refraction index material 1, such as a liquid crystal material. The direction 7 is perpendicular to the surface of the sheet of drawing, and the direction 71 is parallel to the surface of the sheet of drawing and perpendicular to the direction 7. A diffraction grating 21 (not shown), transparent electrodes 31, and transparent substrates 41 are shown.

FIG. 5A shows an element having diffraction gratings 2 and 21 superposed such that their orientation directions are perpendicular to each other and using a pair of the optical modulation elements shown in FIG. 1. With this arrangement, polarized components 60 and 61 of the incident light 5 shown in FIG. 1 can be simultaneously modulated.

FIGS. 5B and 5C show optical modulation elements wherein the diffraction gratings 2 are modified, in which FIG. 5B shows an optical modulation element having a triangular wave diffraction grating and FIG. 5C shows an optical modulation element having a sine wave diffraction grating. In this manner, the diffraction grating of the optical modulation element of the present invention is not limited to a rectangular shape but can be modified to various shapes. However, the equation of the diffraction efficiency as relation equation (1) above differs depending on the selected shape of the diffraction grating.

In the above embodiment, a liquid crystal is used as the variable refraction index material. However, the present invention is applicable even if another variable refraction index material is used.

Examples of other variable refraction index materials include PLZT, $LiNbO_3$, $LiTaO_3$, $TiO_2$, PMMA, $CCl_4$, KDP, ADP, ZnO, $BaTiO_3$, $Bi_{12}SiO_{20}$, $Ba_2NaNb_5O_{15}$, MnBi, EuO, $CS_2$, $Gd_2(MoO_4)_3$, $Bi_4Ti_3O_{12}$, CuCl, CaAs, ZnTe, $As_2Se_3$, Se, AsGeSeS, DKDP, MNA, mNA, UREA, and a photoresist film.

Examples of the crystal liquid include a nematic, cholesteric, smectic, and ferroelectric liquid crystals. However, a liquid crystal material and, above all, a nematic liquid crystal is suitable in the present invention since it is easy to obtain, can be easily controlled, and can be easily orientation-controlled by a diffraction grating. Regarding a control method, an electric field control method is preferable from the response characteristics and ease in driving the optical modulation element as a display element. A variable refraction index material having a large refraction index difference between its abnormal and normal refraction indexes $n_e$ and $n_o$ is preferable in order to allow a large variation in the element arrangement and modulation function. Therefore, a liquid crystal material is suitable from this point of view as well, and a liquid crystal material having a refraction index difference $(n_e - n_o)$ of 0.2 or more is preferable.

When a grating is formed, various methods such as a method having a combination of photolithography and dry etching, a replica method using a thermosetting or ultraviolet-curing resin or the like, a machining method using a ruling engine, an emboss method, and so on are available.

As described above, the optical modulation element according to the present invention can provide total transmission regardless of the wavelength of light and can perform multiplex driving. Therefore, it has a sufficient performance as a subtractive process filter or a display element.

Because of the above characteristics, the optical modulation element of the present invention is considerably effective as a display element in the viewfinder of a camera.

When the light incident on the optical modulation element is light which has passed through an imaging optical system, the light has a plurality of wavelengths of about 400 to 700 nm, Therefore, if $n\theta(\lambda)$ and $n_g(\lambda)$ described above do not coincide, diffraction occurs by these wavelengths even when display is not performed, and a dark portion or a rainbow is undesirably generated when an object is observed through the viewfinder. Furthermore, the quantity of light reaching the eyepiece lens of the viewfinder is decreased, thus darkening the field of view through the viewfinder. All these drawbacks can be solved when the optical modulation element of the present invention is used as the display element.

An optical modulation element according to still another embodiment of the present invention will be described with reference to FIGS. 6 and 7.

In the optical modulation element according to this embodiment, the wavelength dispersion characteristics of the normal or abnormal refraction index $n_o$ or $n_e$ of a liquid crystal 1 and those of the refraction indexing of the material constituting a diffraction grating 2 are set to substantially coincide in the entire wavelength range of the incident light. Alternatively, the curves representing the respective wavelength dispersion characteristics are set substantially parallel to each other. As a result, a decrease in transmittance caused by the wavelength dispersion characteristics of the refraction indexes of the respective portions (the diffraction grating and variable refraction index material) that constitute the element is prevented, thus enabling total transmission.

The practical arrangement of the optical modulation element according to this embodiment will be described. A pair of usual glass substrates were used and a transparent electrode, such as an ITO, was formed on one surface of each glass substrate. A diffraction grating was formed by ODUR1013 (refraction index $n_g = 1.57$; available from Tokyo Oka K.K.) on the transparent electrode on one glass substrate. The two substrates were adhered such that the transparent electrodes opposed each other. RO-TN403 (nematic liquid crystal available from Rosche, $n_e = 1.79$, $n_o = 1.53$) was filled between the two substrates, thus forming an optical modulation element as shown in FIG. 1.

Figure 6:
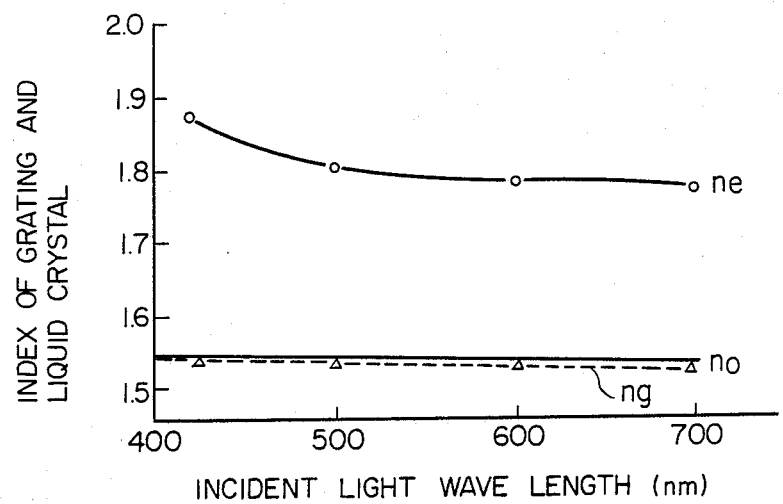
FIG. 6 shows the wavelength dispersion characteristics of the refraction indexes of the diffraction grating and liquid crystal material of an optical modulation element according to still another embodiment of the present invention.

FIG. 6 shows the wavelength dispersion characteristics of the refraction indexes of ODUR1013 ($n_g$) and RO-TN403 ($n_e$, $n_o$) for white light at a normal temperature. In FIG. 6, the wavelength $\lambda$ (nm) of incident light is plotted along the axis of abscissa and the refraction indexes of ODUR1013 and RO-TN403 are plotted along the axis of ordinate. As is seen from FIG. 6, $(n_e - n_o)$ is substantially constant in the entire wavelength range of the incident light and the wavelength dispersion characteristics of $n_g$ and $n_o$ substantially coincide each other. Therefore, total transmission can be obtained.

Figure 7:
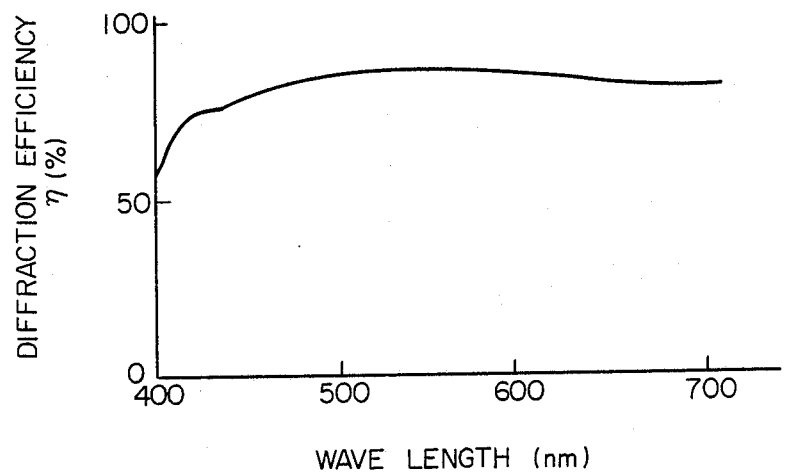
FIG. 7 shows a relationship between the wavelength ($\lambda$) and diffraction efficiency ($\eta_o$) of the optical modulation element according to the embodiment shown in FIG. 6.

FIG. 7 shows a $\lambda$-$\eta_o$ curve of the wavelength ($\lambda$) dependency of the diffraction efficiency $\eta_o$ of the 0th-order transmitted diffracted light of the optical modulation element of this embodiment.

As is seen from FIG. 7, the diffraction efficiency $\eta_o$ of the 0th-order transmitted diffracted light is about 80% in the entire wavelength range (400 to 700 nm) of the incident light, and total transmission can be substantially obtained regardless of the wavelength.

In this embodiment, a transmission-type optical modulation element is shown. However, an optical reflection film can be formed on one substrate, thus providing a reflection-type optical modulation element. In the reflection-type element, however, since the action of the diffracted light in the element becomes complex, the transmission-type optical modulation element is more preferable when design and application of, e.g., an actual display element are considered. In this case, a diffraction grating, a variable refraction index material, a substrate, and so on must be transparent to a used wavelength.

In the above description, a liquid crystal is used as the variable refraction index material. However, another variable refraction index material can also be applied to this embodiment. However, in this embodiment as well, a liquid crystal material and, above all, a nematic liquid crystal is suitable in the present invention since it is easy to obtain, can be easily controlled, and can be easily orientation-controlled by a diffraction grating. Regarding a control method, an electric field control method is preferable from the response characteristics and ease in driving the optical modulation element as a display element. A variable refraction index material having a large refraction index difference between its abnormal and normal refraction indexes $n_e$ and $n_o$ is preferable in order to allow a large variation in the element arrangement and modulation function. Therefore, a liquid crystal material is suitable from this point of view as well, and a liquid crystal material having a refraction index difference ($n_e - n_o$) of 0.2 or more is preferable.

As described above, the optical modulation element according to this embodiment can provide total transmission regardless of the wavelength of light. Therefore, it has a sufficient performance as a display element or a subtractive process filter and can perform display at a high contrast.

According to this embodiment, index matching between the diffraction grating, that provides total transmission, and a variable refraction index material, such as a liquid crystal, is performed by setting either the maximum or minimum refractive index $n_{max}$ ($=n_e$) or $n_{min}$ ($=n_o$) of the liquid crystal to be equal to the refraction index $n_g$ of the diffraction grating. Therefore, index matching can be easily performed.

In the respective embodiments described above, $n_e > n_o$ is satisfied since the respective liquid crystal materials have optically positive birefringences. However, when a liquid crystal has an optically negative birefringence, $n_e < n_o$, and so $n_{max} = n_o$ and $n_{min} = n_e$.

As the liquid crystal 1, other than ones having a positive dielectric anisotropy as in the above embodiments, one having a negative dielectric anisotropy can be used.

As described above, according to the present invention, total transmission can be obtained regardless of the wavelength of incident light. This is because the wavelength dependency characteristic curves of the refraction indexes of the members constituting the element are set substantially equal to each other.

When the characteristics of the optical modulation element according to the present invention are described from an optical point of view, Abbe's numbers $\nu d$, i.e., the dispersion characteristics of two members to be index-matched, e.g., the diffraction grating and the variable refraction index material, such as a liquid crystal, are substantially equalized.

The higher the Abbe's numbers of the respective members (can be infinitely large in principle), the more preferable.

What is claimed is:

1. An optical modulation device comprising:
a first substrate;
a second substrate disposed opposingly to said first substrate;
a liquid crystal layer and optical member alternately arranged between said first and second substrates and substantially in a plane extending parallel to the planes defined by said both substrates, said liquid crystal layer including liquid crystal molecules whose refractive index changes between maximum refractive index Nmax and minimum refractive index Nmin in accordance with their orientation an said optical member having refractive index $N_g$ about equal to refractive index $N_\theta$ where Nmax > $N_\theta$ > Nmin; and
control means for controlling the orientation of said liquid crystal molecules to change the refractive index of said liquid crystal layer.

2. An optical modulation device according to claim 1, wherein materials of said liquid crystal layer and said optical member are selected such that such refractive indices $N_\theta$ and $N_g$ become about equal to each other with respect to all wavelengths in a range of 400 nm through 700 nm.

3. An optical modulation device according to claim 2, wherein said refractive index Nmax is equal to extraordinary refractive index Ne of said liquid crystal molecules and said refractive index Nmin is equal to ordinary refractive index No of said liquid crystal molecules.

4. An optical modulation device according to claim 3, wherein said liquid crystal molecules are nematic liquid crystal having a positive dielectric anisotropy.

5. An optical modulation device according to claim 1, wherein said liquid crystal layer is constructed such that a difference between said maximum and minimum refractive indices is about constant with respect to all wavelengths in range of 400 nm through 700 nm.

6. In an optical modulation device comprising first and second substrates, a relief structure of a predetermined period formed between the first and second substrates, liquid crystal sealed in groove portions of the relief structure and means for changing the refractive index of the liquid crystal to modulate an incident light, the improvement being that the refractive index $N_g$ of said relief structure is about equal to refractive index $N_\theta$ where the maximum refractive index Nmax of said liquid crystal > $N_\theta$ > minimum refractive index Nmin of said liquid crystal.

7. An optical modulation device according to claim 6, wherein material of said liquid crystal and relief structure are such that the refractive indices $N_\theta$ and $N_g$ are about equal to each other with respect to all wavelengths in a range of 400 nm through 700 nm.

* * * * *

UNITED STATES PATENT AND TRADEMARK OFFICE
CERTIFICATE OF CORRECTION

PATENT NO. : 4,822,146

DATED : April 18, 1989

INVENTOR(S) : MASATO YAMANOBE, ET AL.        Page 1 of 3

It is certified that error appears in the above-identified patent and that said Letters Patent is hereby corrected as shown below:

IN [56] REFERENCES CITED

OTHER PUBLICATIONS, under "Kowel, Cleverly, and Kornreich,", "pp. 278-280." should read --pp. 278-289.--.

IN [57] ABSTRACT

Line 3, delete "it as".

COLUMN 1

Line 21, "and" should read --having an--.
    Line 22, delete "making orthogonal" and insert --orthogonal to-- before "each".

COLUMN 2

Line 59, "$n_g$" should be deleted.

COLUMN 4

Line 17, delete "$n_g$ is the refraction index of the diffraction grat-".
    Line 18, delete "ing 2,".
    Line 30, "$\Delta nT=(m+/178)\lambda$" should read --$\Delta nT=(m+1/2)\lambda$--.
    Line 38, "$\eta_o$" should read --$n_o$--.

UNITED STATES PATENT AND TRADEMARK OFFICE
CERTIFICATE OF CORRECTION

PATENT NO. : 4,822,146

DATED : April 18, 1989

INVENTOR(S) : MASATO YAMANOBE, ET AL.

It is certified that error appears in the above-identified patent and that said Letters Patent is hereby corrected as shown below:

COLUMN 4

Line 42, "$\eta_e$" should read --$n_e$--.
Line 43, "$\theta_o$" should read --$n_o$--.
Line 52, "$\eta_o$" should read --$n_o$--.
Line 61, "$\eta_g=\eta_o$," should read --$n_g=n_o$,--.
Line 63, "$\eta_o$" should read --$n_o$--.

COLUMN 5

Line 29, "($n_o<n_o$-" should read --($n_o<n\theta$- --.
Line 31, "$n_g$" should be deleted.
Line 57, "($n_{min}<n_o<n_{max}$)" should read --($n_{min}<n\theta<n_{max}$)--.

COLUMN 8

Line 9, "refraction indexing" should read --refraction index $n_g$--.
Line 44, "cide each" should read --cide with each--.

COLUMN 9

Line 54, "(can" should read --(which can--.

UNITED STATES PATENT AND TRADEMARK OFFICE
CERTIFICATE OF CORRECTION

PATENT NO. : 4,822,146
DATED : April 18, 1989
INVENTOR(S) : MASATO YAMANOBE, ET AL.

Page 3 of 3

It is certified that error appears in the above-identified patent and that said Letters Patent is hereby corrected as shown below:

COLUMN 10

Line 14, "an" should read --,-- (comma).
Line 38, "in range" should read --in a range--.

Signed and Sealed this

Tenth Day of April, 1990

Attest:

HARRY F. MANBECK, JR.

*Attesting Officer*     *Commissioner of Patents and Trademarks*